Patented Nov. 21, 1939

2,180,769

UNITED STATES PATENT OFFICE 2,180,769

PROCESS FOR PRODUCING EASILY SOLUBLE COERULEIN DERIVATIVES

Eduard Peyer, Basel, Switzerland, assignor to the firm of Durand & Huguenin A. G., Basel, Switzerland No Drawing. Application April 14, 1938, Serial No. 202,129. In Germany April 21, 1937

5 Claims. (Cl. 260—335)

The United States Patent No. 2,137,143 describes a process for the manufacture of sulphonated pyrogallol coeruleins, comprising the treatment of reduced gallein with a dehydrating and at the same time sulphonating agent, such as concentrated sulphuric acid, sulphuric acid monohydrate, weak oleum or chlorosulphonic acid.

Now it has been found that the sulphonic acid of the dyestuff obtained by this method can easily be converted, by treatment with an aqueous solution of a sulphurous acid salt into a compound yielding in printing on cotton deeper and clearer shades. The same is also more suitable for the dyeing of silk than the starting material.

It could not be expected, that a sulphonic acid of the coerulein would form addition products with salts of the sulphurous acid.

The new compound represents a yellowish-green to green powder which is easily soluble in water.

The improved process can also be applied to sulphonic acids of coerulein obtained for instance according to the German Patent 445,847.

In this way products are obtained, which, compared with the initial material, show the same improvement of the dyeing properties as said above.

The following example illustrates the invention, the parts being by weight:

20 parts of the sulphonic acid of coerulein obtained and isolated according to the process of the aforesaid United States patent application are introduced into a solution of 15 parts of sodium-bisulphite in 80 parts of water. The mass thus obtained is slightly heated. By adding common salt thereto yellow-green crystals are separated, which are filtered off and dried.

The new body represents a yellow-green to green easily water-soluble powder.

When dyeing on silk or printing on cotton in the presence of a chromium mordant, clear green shades are obtained.

With a similar result the sodium-bisulphite can be replaced by other salts of the sulphurous acid, for instance by ammonium-bisulphite or potassium-bisulphite.

For printing or dyeing purposes it is not necessary to separate the new compound in solid form; the solution thereof as obtained according to the example or in a similar way can directly be used.

What I claim is:

1. A process for producing coerulein derivatives, which comprises treating a pyrogallol coerulein sulphonic acid with an aqueous solution of a salt of sulphurous acid.

2. A process for producing coerulein derivatives, which comprises treating a pyrogallol coerulein sulphonic acid with an aqueous solution of sodium bisulphite.

3. A process for producing coerulein derivatives, which comprises treating a pyrogallol coerulein sulphonic acid with an aqueous solution of ammonium bisulphite.

4. A process for producing coerulein derivatives, which comprises treating a pyrogallol coerulein sulphonic acid with an aqueous solution of potassium bisulphite.

5. Derivatives of pyrogallol coerulein from the interaction of pyrogallol coerulein sulphonic acids with an aqueous solution of a salt of sulphurous acid, giving when dyeing on silk or printing on cotton in the presence of a chromium mordant clear green shades of good fastness properties.

EDUARD PEYER.